Patented Apr. 18, 1950

2,504,400

UNITED STATES PATENT OFFICE 2,504,400

PRODUCTION OF POLYETHYLENE WAXES

Michael Erchak, Jr., Morris Plains, N. J., assignor to Allied Chemical & Dye Corporation, New York, N. Y., a corporation of New York No Drawing. Application December 2, 1947, Serial No. 789,329

5 Claims. (Cl. 260—94.9)

This invention relates to a process for the production of waxes by polymerization of ethylene in presence of hydrogen peroxide as catalyst.

It has been proposed in the past to use hydrogen peroxide as catalyst in polymerizing ethylene to waxes; but in spite of the higher cost benzoyl peroxide has been used because benzoyl peroxide was found to give a much better yield of wax than obtained with hydrogen peroxide at least under the conditions of moderate ethylene pressures used for technical polymerization of ethylene to waxes.

I have now found conditions which make possible the technical application of hydrogen peroxide in isopropanol reaction medium as catalyst of the polymerization of ethylene to hard high-melting waxes in good yield and at moderate ethylene pressures. Critical operating variables which must be controlled in accordance with my invention are conditions of pressure, temperature, volume ratio of reaction medium: reaction space and concentration of the hydrogen peroxide catalyst. Other factors discussed below may also require control under certain circumstances in accordance with my invention.

The ethylene pressures employed in my process should be at least about 425 atmospheres but should not exceed about 475 atmospheres. This range has been found to produce a wax of superior properties in high yields.

The temperature range employed in my process is a narrow one, departure from which results in loss of quality or yield of the wax, or both. In general, in the catalytic polymerization of ethylene as the temperatures are increased a temperature is reached at which a sudden pressure increase occurs marking the start of a rapid polymerization of the ethylene. As the temperature increases above this decomposition temperature of the catalyst, the yield of ethylene polymers obtained in given time with a given quantity of catalyst generally increases but at the same time the products formed become progressively softer. I have found a temperature range in which under the conditions of my process a high yield of wax is obtained with a given quantity of hydrogen peroxide catalyst yet the wax product remains hard and high-melting. This temperature range is from 140° to 200° C.

I have found further that the volume ratio of isopropanol:total reaction space in the reactor under the conditions of my process exerts a very significant effect on both yield and quality of the wax product. The isopropanol forms a separate phase from the gaseous ethylene; hence, the ratio of the volume of isopropanol:total reaction space would not be expected to have any effect of its own, independent of the above-mentioned variables, on the course of the polymerization. However, I find as the volume of reaction medium in a given reactor is increased with pressure, temperature, and amount of catalyst added constant, the yield of wax at first increases rapidly then falls off rapidly. Furthermore, the wax product becomes softer as the volume of reaction medium is increased, even though the catalyst concentration in the reaction medium is decreasing.

Under my process conditions I find that the volume of the isopropanol reaction medium should be from about 5% to about 10% of the total volume of the reaction zone. If it is desired to obtain a wax of maximum hardness and high melting point, and if the upper ranges of isopropanol volumes are to be used, then the temperatures maintained during the reaction period must be confined to a narrower range than the 140° C. to 200° C. range set out above. For example if the reaction medium occupies 10% of the total volume of the reaction zone and the product is to be a hard wax melting above 105° C., the temperatures maintained during the reaction period should be in the range 140° C. to 170° C.

The concentration of the hydrogen peroxide catalyst in my process should be from about 0.1–2% by weight of hydrogen peroxide (100% hydrogen peroxide basis) on the weight of the isopropanol. Smaller amounts of catalyst result in an undesirably low rate of reaction while larger quantities of catalyst tend to make the wax product soft without increasing the yield obtained in a given time. Suitably the hydrogen peroxide is employed in the form of the aqueous solution containing 30% hydrogen peroxide, but equally good or better results are obtained using say 90% solution.

The following examples illustrate my invention but are not intended to limit the scope of the invention.

The procedure employed in the examples was as follows. Commercial tank ethylene of purity 99.5% containing nitrogen, ethane and oxygen as the chief impurities was drawn into a compression chamber through a deoxygenator consisting of a pressure-resistant vessel containing reduced copper oxide maintained at 170°–200° C. and a pressure-resistant vessel containing silica gel at room temperature. The deoxygenated ethylene contained less than 0.01% by weight of oxygen.

The deoxygenated ethylene was compressed in a hydraulic compressor to about 1000 atmospheres pressure. The reaction vessel was charged with the desired quantity of isopropanol and with the hydrogen peroxide catalyst, neither one specially purified. This operation was carried out in an inert or an ethylene atmosphere. The reactor was then evacuated and placed in the heating jacket of an autoclave rocker provided with an autoclave transformer and a controlling thermocouple for temperature control. Heating and agitation were started. Ethylene was admitted to the reactor from the high pressure source until the desired ethylene pressure was reached on a hydraulic dial gauge.

The period of rapid reaction began at a temperature never less than about 130° C.; the beginning of this period was marked by a sudden pressure and temperature rise. Heating was continued until the desired temperature was reached and this temperature was then maintained over the desired reaction period. The ethylene pressure was maintained by intermittent addition of ethylene to the reactor.

After the reaction period was over the reactor was removed from the rocker, cooled, bled of excess ethylene and discharged. The main portion of the product was recovered by filtering off the isopropanol and washing the precipitate with acetone or ether; a small additional portion was recovered by distilling off the combined wash liquids and isopropanol filtrate. The product was dried under vacuum slightly above its melting point.

A wax is hard in the sense the term is used herein if at 22° C. the penetration by an A. S. T. M. needle in 30 secs. with a total load of 200 gms. (Krebs penetrometer) is less than 1 mm. The penetration of a wax classed as medium hard in the same test is 2.5–3 mm. A high-melting wax in the sense the term is used herein has a melting point of from 105° to 115° C. as determined by the method for paraffin waxes described in A. S. T. M. Standards, 1944, part III, page 211, published by the American Society for Testing Materials. The molecular weight of a typical hard high-melting wax obtained as in the examples was about 3000 as calculated from viscosity measurements in tetralin at 75° C. by the Staudinger equation:

$$\text{Molecular weight} = \frac{N_{sp}}{K_m C}$$

wherein $N_{sp}=$ (Viscosity of solution-Viscosity of solvent)/Viscosity of solvent
$K_m = 0.85 \times 10^{-4}$
$C =$ Concentration of the solution expressed as the number of mols of the chain unit, $CH_2$, per liter.

*Example 1.*—Ethylene was polymerized in an 1820 cc. stainless steel autoclave as described above using as reaction medium about 10% of the reactor volume of isopropanol and as catalyst about 0.4% by weight on the isopropanol (100% $H_2O_2$ basis) of 30% aqueous hydrogen peroxide. The reaction started at 150° C. and a pressure of 6200 p. s. i. The pressure rose to 6900 p. s. i., and during the reaction period varied from 6800 to 7000 p. s. i. The temperature was maintained at about 164° C. The reaction was continued for about 2.5 hours. 132 grams of a very hard white odorless wax of a melting point of about 112° C. were obtained.

*Example 2.*—In an experiment in which the procedure of Example 1 was employed except that the temperature was maintained at about 200° C., 158 grams of wax were formed but the wax was somewhat softer than the product obtained in Example 1 at 164° C.; it may be classed as medium hard.

*Example 3.*—Ethylene was polymerized by the method of Example 2 except that the quantity of catalyst was about 0.2% by weight on the isopropanol (100% $H_2O_2$ basis) of 30% aqueous hydrogen peroxide. The wax product obtained weighed 139 grams as compared to 158 grams obtained in the same time in Example 2. The two waxes were very similar in hardness and other properties.

*Example 4.*—When a volume of isopropanol equal to about 8%, instead of 10%, of the reactor volume was employed in the procedure of Example 3, the wax product was harder than the product of Example 3 but amounted to 118 rather than 139 grams. This wax product may be classed as a hard wax.

As mentioned above in the discussion of the effect of temperature it is found that when a sufficiently elevated temperature is reached a rapid polymerization of ethylene occurs. In a batch process successive charges of ethylene may be admitted to the reactor to restore the ethylene pressure and these charges will be polymerized at a rate which falls off as the amount of ethylene which has been polymerized increases. The decrease in reaction rate is probably due to exhaustion of the catalyst from the reaction medium by conversion of the catalyst to reaction products. In the 1820 cc. stainless steel reactor of the above examples the polymerization rate drops off very rapidly after about 2 to 3 hours of reaction under the conditions of the examples. In continuous operations the reaction medium is continuously being renewed so that no progressive falling off in reaction rate occurs as the reaction is continued.

Analysis of the above waxes and study of the reactions of these products and related products of lower molecular weight indicate that the structural formulae of the compounds making up the waxes formed in isopropanol may be written: $CH_3(C_2H_4)_nC(OH)(CH_3)_2$, where $n$ is an integer. These waxes are a mixture of individual homologues having varying values for $n$. One feature of my invention is that all of the ethylene polymerized forms wax; that is, the molecular weight distribution in my products brings substantially all the individual values for $n$ into the wax range. The average value of $n$ is found numerically by measurement of the viscosity of the wax. In the hard waxes of the examples this average value for $n$ is about 100.

In the examples above a pure grade of commercial isopropanol was used. Technical grades may also be used containing, say, up to 10% by weight of water. When as much as 10% of water is present the yield of wax obtained with given volume of reaction medium is somewhat reduced as compared to the yield with less water present. For example, the yield is reduced from 158 grams as in Example 2 using an isopropanol reaction medium in which 0.7% by weight of water is present to 130 grams using the same volume of an isopropanol reaction medium in which 10% by weight of water is present. The wax products, however, have substantially the same properties. With very large amounts of water present the properties begin to change from wax-like to plastic and the yield continues to fall off. Accordingly, I prefer to use a reaction medium containing not more than about 10% by weight of water.

The ethylene used in the above examples was commercial ethylene containing not more than 0.5% of impurities. Of impurities to be expected in commercial ethylene only oxygen has a considerable effect when present in small amounts. The commercial ethylenes employed in the above examples contain less than 0.15% by weight of oxygen and can be used in my process without prior removal of the oxygen without appreciably affecting the results. I have found, however, that the ethylene passed to the process preferably should not contain more than about 0.15% by weight of oxygen since larger amounts of oxygen tend to make the wax product softer and to reduce the yield. Other impurities in commercial ethylenes such as nitrogen, methane, ethane and propylene have no serious effect on the results of my process at least up to amounts of 10% or more by weight of impurities in the ethylene, but impurities should preferably be restricted to a total of not more than 10% by weight of the ethylene.

The reactor used in my process may be constructed of or lined with various inert materials such as nickel, stainless steel, manganese steel, aluminum or glass.

I claim:

1. A process for the production of at least medium hard, high-melting waxes from ethylene which comprises maintaining ethylene under pressures between about 425 and 475 atmospheres and at temperatures between about 140° C. and 200° C. in contact with isopropanol in amount sufficient to occupy from about 5% to about 10% of the total volume of the reaction zone and containing from about 0.1 to about 2% by weight on the isopropanol of hydrogen peroxide on a 100% hydrogen peroxide basis.

2. A process in accordance with claim 1 in which the ethylene is at least about 90% pure on a weight basis and contains not more than about 0.15% by weight of oxygen.

3. A process in accordance with claim 1 in which the isopropanol contains no more than 10 weight percent of water.

4. A process in accordance with claim 1 in which the temperatures are between about 140° C. and about 170° C.

5. A process for the production of hard, high-melting waxes from ethylene which comprises introducing into a reaction zone maintained at temperatures between about 140° C. and about 170° C. ethylene of at least 90% purity on a weight basis, containing not more than 0.15% by weight of oxygen and maintained under pressures in the reaction zone between about 425 and about 475 atmospheres, introducing isopropanol of at least 90% purity on a weight basis which isopropanol occupies from about 5% to about 10% of the total volume of the reaction zone, and introducing hydrogen peroxide in amounts between 0.1% and 2% by weight of the isopropanol on a 100% hydrogen peroxide basis.

MICHAEL ERCHAK, JR.

REFERENCES CITED

The following references are of record in the file of this patent:

UNITED STATES PATENTS

| Number | Name | Date |
| --- | --- | --- |
| 2,391,920 | Paterson | Jan. 1, 1946 |
| 2,396,920 | Larson | Mar. 19, 1946 |